United States Patent
Csonka et al.

(12) 
(10) Patent No.: US 6,238,742 B1
(45) Date of Patent: May 29, 2001

(54) PROCESS FOR PRE-ADHERING A DRAWN POLYESTER FILAMENT BY APPLYING POLYEPOXIDE AND TERTIARY AMINE AT SEPARATE SITES

(75) Inventors: Istvan Csonka, Lucerne; Beat Meyer, Rothenburg, both of (CH)

(73) Assignee: Rhodia Filtec AG, Emmenbruecke (CH)

( * ) Notice: Subject to any disclaimer, the term of this patent is extended or adjusted under 35 U.S.C. 154(b) by 0 days.

(21) Appl. No.: 09/402,186

(22) PCT Filed: Apr. 6, 1998

(86) PCT No.: PCT/CH98/00127
§ 371 Date: Sep. 30, 1999
§ 102(e) Date: Sep. 30, 1999

(87) PCT Pub. No.: WO98/45357
PCT Pub. Date: Oct. 18, 1998

(30) Foreign Application Priority Data

Jul. 7, 1997 (CH) .................................................. 799/97

(51) Int. Cl.⁷ .................. B05D 1/34; B05D 1/36
(52) U.S. Cl. .................. 427/300; 427/333; 427/342; 427/386; 427/410; 427/412; 427/412.5
(58) Field of Search ................................. 427/300, 333, 427/342, 386, 410, 412, 412.5

(56) References Cited

U.S. PATENT DOCUMENTS 5,352,483 * 10/1994 Humbrecht et al. .................. 427/175

OTHER PUBLICATIONS

Kirk–Othmer Encyclopedia of Chemical Technology, Fourth Edition, vol. 9, pp. 741–744, 1994.*

* cited by examiner

*Primary Examiner*—Erma Cameron
(74) *Attorney, Agent, or Firm*—Michael J. Striker

(57) ABSTRACT

The process for preadherizing a drawn polyester filament to improve adhesion of rubber material with the filament includes applying a preadherizing agent to a running drawn polyester filament. The preadherizing agent is made by mixing a first solution containing a polyepoxide and a second solution containing a tertiary amine. In order to minimize soiling of the applicators used to apply the solutions to the running drawn polyester filament, the first solution is applied to the running drawn polyester filament at a site spaced a predetermined distance from the site at which the second solution is applied.

4 Claims, 1 Drawing Sheet

PROCESS FOR PRE-ADHERING A DRAWN POLYESTER FILAMENT BY APPLYING POLYEPOXIDE AND TERTIARY AMINE AT SEPARATE SITES

BACKGROUND OF THE INVENTION

1. Field of the Invention

The invention relates to a process for preadherizing polyester filaments to improve the adhesion characteristics towards rubber, especially for tire cord, by applying the preadherizing agent, consisting of at least two soluble components, one component (A) containing a polyepoxide and one component (B) containing a tertiary amine, after a filament yarn has been drawn.

2. Prior Art

Numerous processes are known for preadherizing polyester filaments to improve the adhesion properties towards rubber, and they generally involve the adherizing agents being applied prior to drawing of the yarn. But it is also known to apply a preadherizing agent consisting of two components to the drawn filament yarn so as to avoid soiling the drawing assemblies (WO 84/03707). In this known process, the preadherizing agent is applied via a metering pin. All existing processes apply a mixture which has ideally been prepared immediately before application and which ideally comprises a homogeneous distribution of the individual main components in a solution. To minimize the risk of coalescence and plugging and yet ensure uniform application, the applicator means have to be replaced and cleaned after an on-stream time of not more than 24 hours and the related pumps, containers and pipework after not more than 14 days.

SUMMARY OF THE INVENTION

It is an object of the present invention to provide a process which minimizes any soiling of the applicator means and hence increases the productivity of the entire spinning installation.

This object is achieved according to the invention when the component (A) and the component (B) are applied separately to the running filament yarn i.e. at the same time or stepwise to the running yarn, but at respective different locations on the running yarn. This has the advantage that the components only become mixed on the yarn and thus are not able to soil the applicator means with curing resin. The process according to the invention appreciably increases the on-stream times. Cleaning of the applicator means is then only necessary in the event of batch changes and for safety reasons. A further advantage is a more uniform distribution on the yarn and hence an improvement in the yarn run-off in the course of further processing.

BRIEF DESCRIPTION OF THE DRAWING

The objects, features and advantages of the invention will now be described in more detail, with reference to the following detailed description and figures, in which.

DESCRIPTION OF THE PREFERRED EMBODIMENTS

Figure 1:
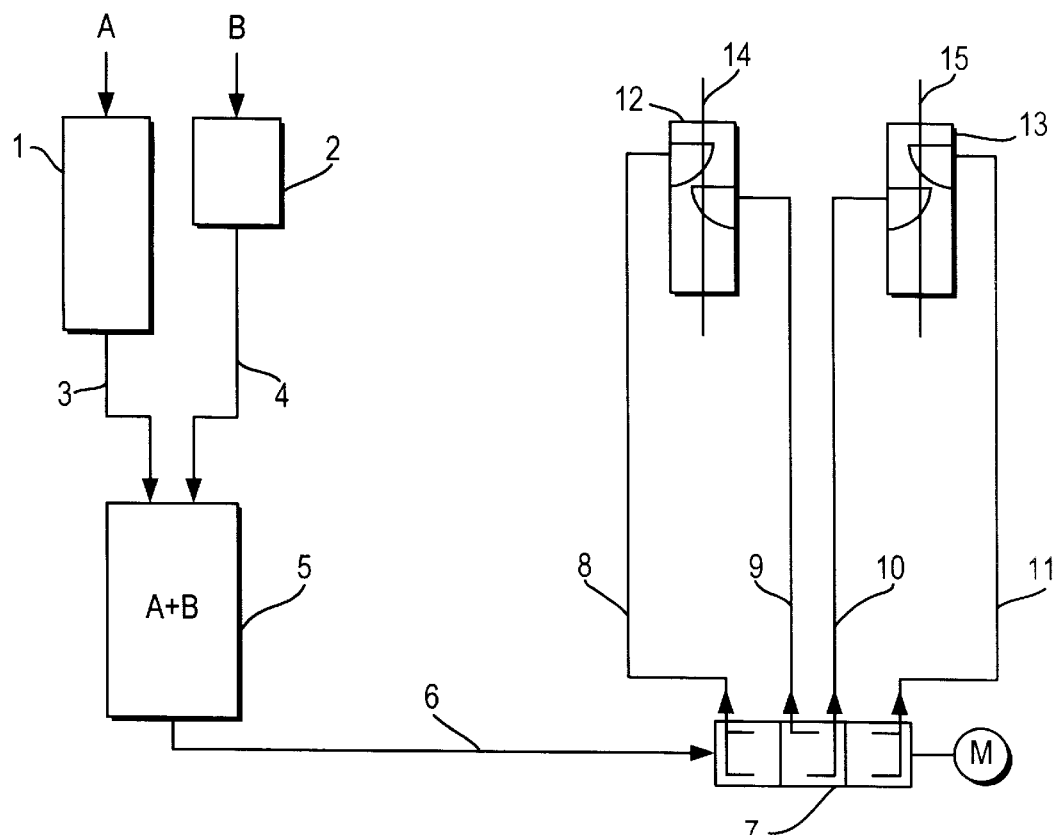
FIG. 1 is a flow chart of a process for preadherizing a polyester filament according to the prior art.

In FIG. 1 the reference numeral 1 identifies a container which contains a stock solution A. A second container 2 contains a stock solution B. A mixing container 5 communicates with the container 1 via a line 3 and with the container 2 via a line 4. The mixing container 5 holds a mixing means (not illustrated) which is intended to homogenize the stock solutions A and B. A metering means 7 communicates with the mixing container 5 via a line 6. The metering means 7 consists of a multichamber pump which is driven by a motor M. Lines 8 and 9 lead to an applicator means 12 and lines 10 and 11 to an applicator means 13. A yarn 14 passes through the applicator means 12 and a yarn 15 through the applicator means 13.

In operation, the mixture of the stock solutions A and B is applied to the yarns 14 and 15 in the process according to the prior art shown in FIG. 1.

Figure 2:
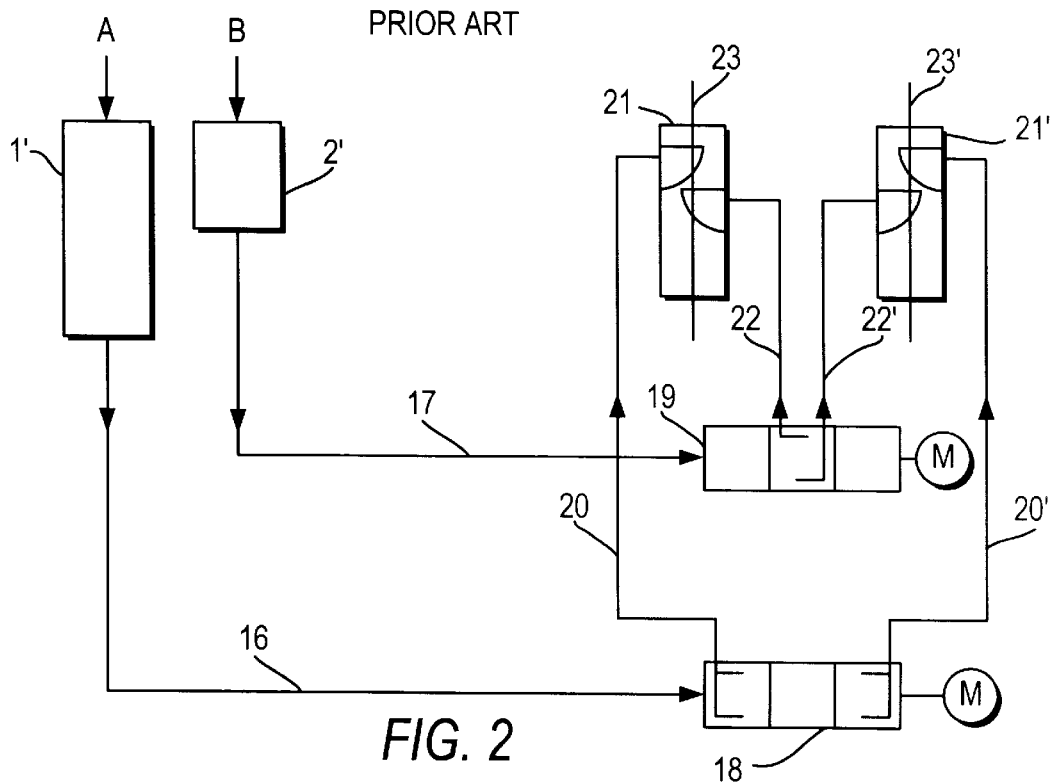
FIG. 2 is a flow chart of a process for preadherizing a polyester filament according to the invention.

In FIG. 2 the reference numeral 1' identifies a container which contains a stock solution A. A second container 2' contains a stock solution B. A metering means 18 is directly connected via a line 16. A metering means 19 is likewise directly connected via a line 17. A line 20 leads from the metering means 18 to an applicator means 21 and a line 20' to an applicator means 21'. A line 22 leads from the metering means 19 to the applicator means 21; a line 22' leads to the applicator means 21'. A yarn 23 passes through the applicator means 21 and a yarn 23' through the applicator means 21'.

In operation, the stock solutions A and B are passed separately through the lines 16 and 17, respectively, in a ratio of 2:1 by means of the metering pumps 18 and 19 via the lines 20, 20' on the one hand and 22 and 22' on the other, respectively, to the applicator means 21 and 21', respectively. The stock solutions A and B can be applied to the running yarns 23 and 23' simultaneously or stepwise without mixing solutions A and B before applying them to the yarn.

In one example of the method according to the invention the stock solution A is applied to the polyester filament at a site that is a predetermined distance, for example 50 mm, from the site at which the stock solution B is applied.

OPERATIVE EXAMPLE (FIG. 2)

The arrangement of the invention was used to apply a two-step application to a 1100 dtex 192 filament yarn during 48 hours.

COMPARATIVE EXAMPLE (FIG. 1)

The results are summarized in Table 1.

TABLE I

Strip-test Pull and Appearance Results for Drawn Polyester Filament Pre-adherized according to the Invention

|  | Strip-test pull in [N] | Appearance rating |
|---|---|---|
| Operative example | 257 | 3.6 |
| Comparative example | 238 | 3.25 |

The process according to the invention provides an approximately 8% better adhesion while other yarn properties remained the same. It became possible to approximately double the on-stream times to the next clean and hence to increase the productivity significantly.

What is claimed is:

1. A process for preadherizing a polyester filament to improve adhesion of rubber material with the filament, said process comprising the steps of:

a) supplying a first soluble ingredient to a running or moving drawn polyester filament at a first location so as to apply the first soluble ingredient to the drawn polyester filament at said first location; and b) supplying a second soluble ingredient to the running or moving drawn polyester filament at a second location spaced a predetermined distance downstream in a filament running direction from said first location, so as to mix the second soluble ingredient with the first soluble ingredient in order to thus form the preadherizing agent on the drawn polyester filament;

wherein said first soluble ingredient comprises a polyepoxide and said second soluble ingredient comprises a tertiary amine.

2. The process as defined in claim 1, wherein said supplying of said first ingredient and said supplying of said second ingredient are performed simultaneously so that said first ingredient and second ingredient are simultaneously applied to the drawn polyester filament, but at separate locations separated by said predetermined distance.

3. The process as defined in claim 1, wherein said supplying of said first ingredient and said supplying of said second ingredient are performed stepwise.

4. The process as defined in claim 1, wherein said predetermined distance is 50 mm.

* * * * *